Figure 1:
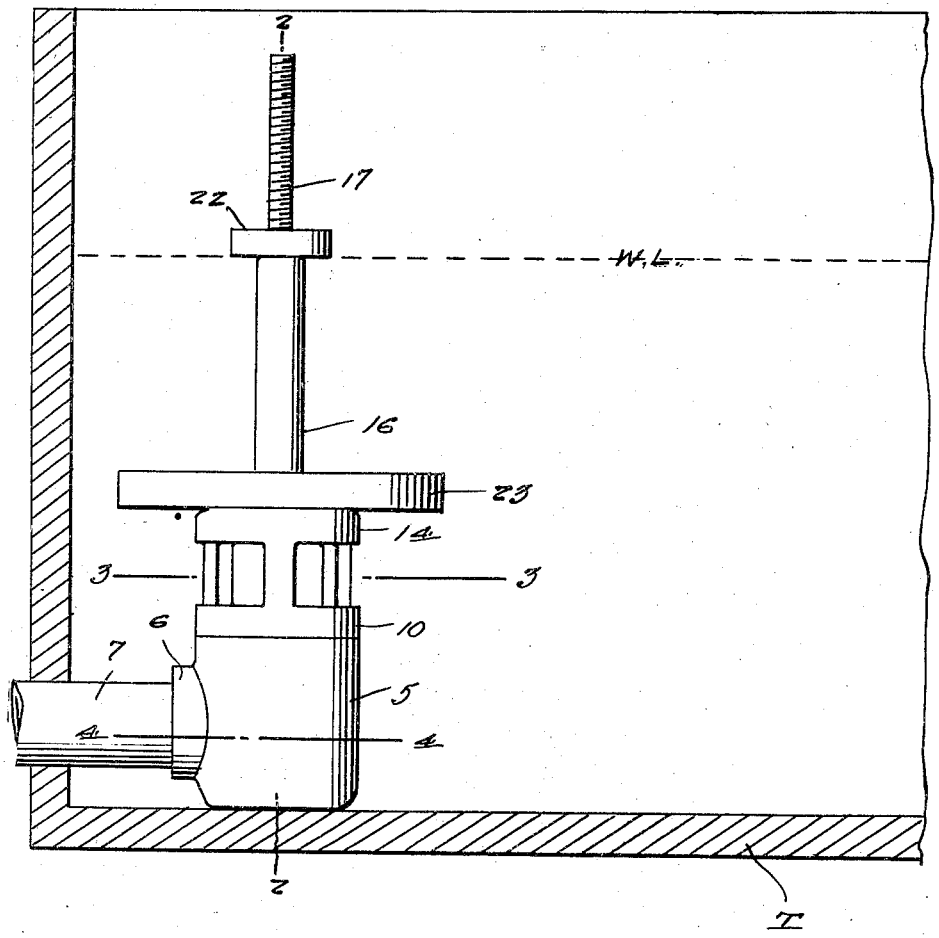

Sept. 29, 1931. C. E. SCHILLING 1,825,367
FLOAT CONTROLLED VALVE
Filed July 1, 1929 2 Sheets-Sheet 1

Inventor
Charles E. Schilling
By Clarence A. O'Brien
Attorney

Sept. 29, 1931.   C. E. SCHILLING   1,825,367
FLOAT CONTROLLED VALVE
Filed July 1, 1929   2 Sheets-Sheet 2
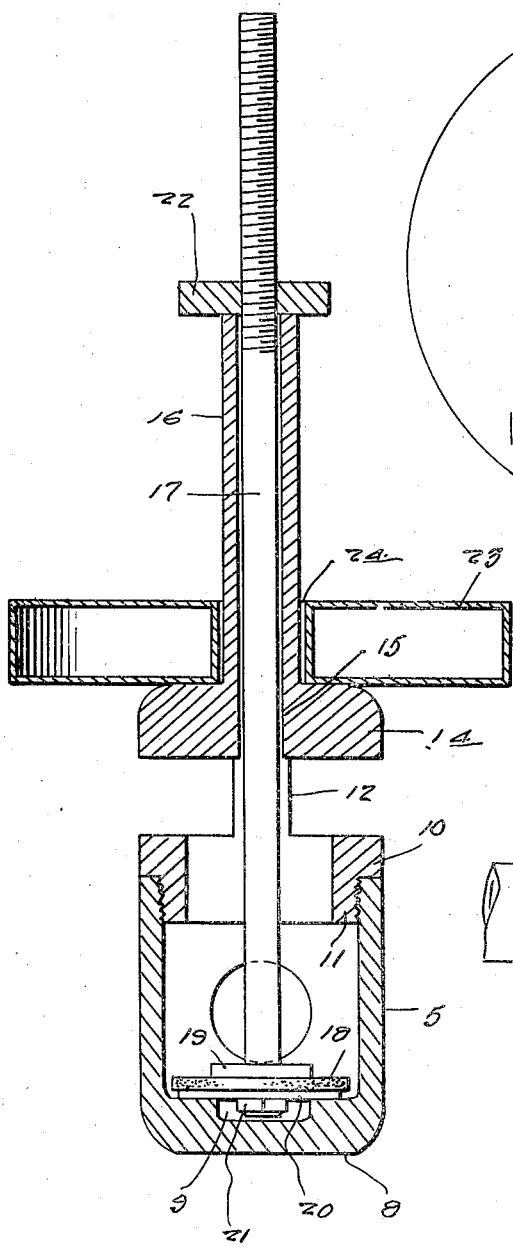
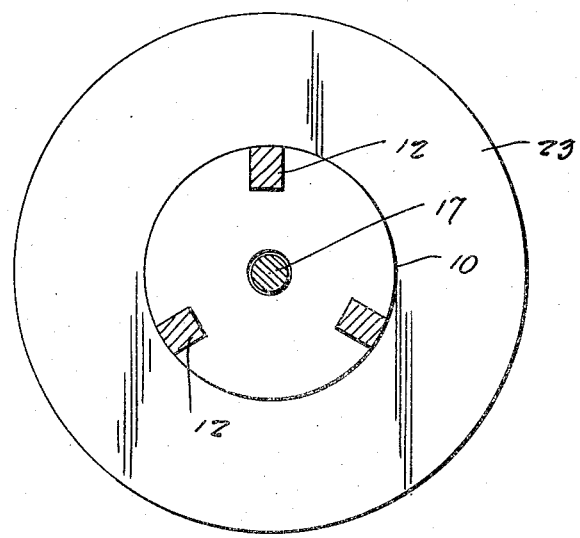
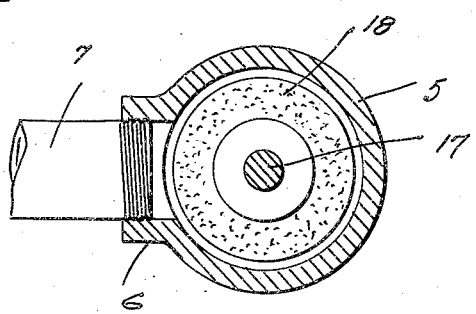
Inventor
Charles E. Schilling
By Clarence A. O'Brien
Attorney Patented Sept. 29, 1931

1,825,367

UNITED STATES PATENT OFFICE

CHARLES E. SCHILLING, OF WILLCOX, ARIZONA, ASSIGNOR OF ONE-HALF TO E. A. SCHILLING, OF WILLCOX, ARIZONA

FLOAT CONTROLLED VALVE

Application filed July 1, 1929. Serial No. 375,072.

The present invention relates to float controlled valves for water tanks and the like and has for its prime object to provide a simple construction which may be manufactured at a low cost, easy to assemble and disassemble, not likely to easily become out of order, and otherwise thoroughly efficient and reliable in use and operation.

With the above and numerous other objects in view as will appear as the description proceeds, the invention resides in certain novel features of construction, and in the combination and arrangement of parts as will be hereinafter more fully described and claimed.

Figure 5:
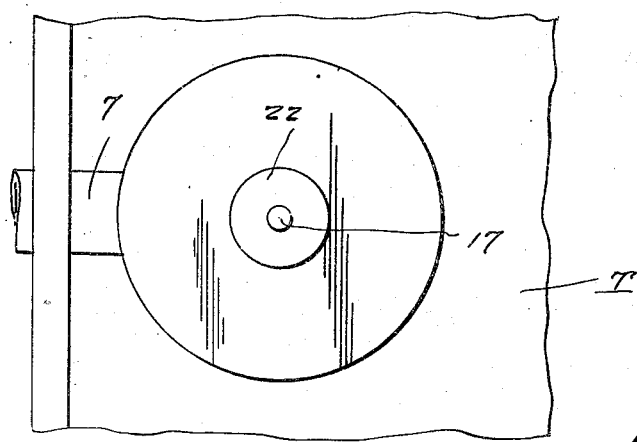

In the drawings:

Figure 1 is a sectional view through a tank showing my valve mounted therein,

Figure 2 is a sectional view taken through the valve substantially on the line 2—2 of Figure 1, Figures 3 and 4 are horizontal sections taken substantially on the lines 3—3 and 4—4 of Figure 1, and Figure 5 is a top plan view of the valve.

Referring to the drawings in detail it will be seen that the numeral 5 denotes a cylindrical casing with a radial neck 6 extending therefrom with which water pipe 7 is connected. The numeral 8 denotes the bottom of the cylinder which is countersunk as at 9. A cap comprises a ring 10 reduced to form an externally threaded flange 11 engaged in the upper end of the cylinder 5 and provided with upwardly extending spaced ribs 12 connected to a plate 14 formed with a central opening 15 and having a sleeve 16 rising therefrom to be registered with the opening 15.

A valve rod 17 extends through the sleeve and the opening 15 and has a valve 18 mounted thereon between a shoulder 19 on the lower end of the rod and a washer 20 held tightly against the valve 18 by means of nut 21. The countersunk portion 9 accommodates the nut 20 and the lower end or extremity of the rod 17 when the washer 20 is seated on the bottom 8 that is when the valve is in a closed position.

A nut 22 is threaded on the upper end of the rod. A hollow float 23 has a central opening 24 circumjacent the sleeve 16. When the water rises to a predetermined level in the tank T in which this valve mechanism is located the float 23 will rise to engage the nut 22 and lift said nut and the valve stem 17 to abut the valve 18 with the lower edge of the flange 11 thus cutting off the water as will be quite apparent.

An advantage of this valve is that it does not leak at all when the valve is closed and when it is open the valve proper drops below the water pipe. When the valve is closed the force of the water assists in maintaining it closed so that the stronger the water pressure the tighter the valve is closed.

Furthermore trash will not settle in the valve because when it is opened it is below the flow of the water and the trash must float to the top away from the valve.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A device of the class described comprising a vertical cylinder formed with a bottom, a neck radiating outwardly from the cylinder to form an inlet, a cap threadedly engaged in the upper end of the cylinder and being hollow and having circumferentially arranged lateral openings, a sleeve rising from the cap, a rod slidable through the sleeve and the cap, a valve on the lower end of the rod within the cylinder to normally rest on the bottom and to rise in abutment with the cap to close the opening therethrough, a float circumjacent the sleeve, a nut on the upper portion of the rod with which the float may engage to raise the rod and close the valve.

2. A device of the class described comprising a vertical cylindrical casing provided with a bottom, a lateral inlet for the casing, a cap engaging the upper end of the casing and having circumferentially arranged lateral openings, a sleeve rising from the cap, a rod slidable through the sleeve and the cap, a valve on the lower end of the rod within the casing to normally rest on the bottom and to rise in abutment with the cap to close the opening therethrough, a float circumjacent the sleeve, a nut on the upper portion of the rod with which the float may engage to raise the rod and close the valve, said valve being mounted on the rod between the shoulder fixed to the rod and a washer, a nut for holding the washer in place, and said bottom being countersunk to receive the nut on the lower extremity of the rod.

In testimony whereof I affix my signature.

CHARLES E. SCHILLING.